US007929124B2

(12) United States Patent
Schuetzmann et al.

(10) Patent No.: US 7,929,124 B2

(45) Date of Patent: Apr. 19, 2011

(54) SECURITY ELEMENT

(75) Inventors: Juergen Schuetzmann, Pfaffenhofen (DE); Bernd Wunderer, Munich (DE); Manfred Heim, Munich (DE)

(73) Assignee: Giesecke & Devrient GmbH, Munich (DE)

(*) Notice: Subject to any disclaimer, the term of this patent is extended or adjusted under 35 U.S.C. 154(b) by 1067 days.

(21) Appl. No.: 10/564,625

(22) PCT Filed: Jul. 12, 2004

(86) PCT No.: PCT/EP2004/007680

§ 371 (c)(1), (2), (4) Date: Oct. 24, 2006

(87) PCT Pub. No.: WO2005/005727

PCT Pub. Date: Jan. 20, 2005

(65) Prior Publication Data

US 2008/0106725 A1 May 8, 2008

(30) Foreign Application Priority Data

Jul. 14, 2003 (DE) .................................. 103 31 798

(51) Int. Cl.

*G06K 9/74* (2006.01)

(52) U.S. Cl. ........................................................... 356/71

(58) Field of Classification Search ..................... 356/71

See application file for complete search history.

(56) References Cited

U.S. PATENT DOCUMENTS

| | | | | |
|---|---|---|---|---|
| 4,443,225 | A * | 4/1984 | Wolff et al. | 8/549 |
| 5,739,296 | A * | 4/1998 | Gvon et al. | 534/577 |
| 6,319,963 | B1 * | 11/2001 | Coates et al. | 522/1 |
| 6,627,270 | B1 * | 9/2003 | Nishimura | 428/1.3 |
| 6,875,481 | B2 * | 4/2005 | Nishimura | 428/1.1 |
| 2004/0021863 | A1 * | 2/2004 | Kurata et al. | 356/364 |
| 2005/0012998 | A1 * | 1/2005 | Kumar et al. | 359/494 |
| 2005/0024626 | A1 * | 2/2005 | Faris | 356/71 |

OTHER PUBLICATIONS

Moia, F., *New coloured optical security elements during Rolic's LPP/LCP technology: devices for 1st to 3rd level inspection*, Optical Security and Counterfeit Deterrence Techniques IV, Proceedings of SPIE vol. 4677, (2002), 194-202.

* cited by examiner

*Primary Examiner* — Roy Punnoose

(74) *Attorney, Agent, or Firm* — Rothwell, Figg, Ernst & Manbeck, P.C.

(57) ABSTRACT

The invention relates to an object of value with a security element, which has at least one liquid-crystalline material, the liquid-crystalline material effecting a linear polarization of light.

15 Claims, 3 Drawing Sheets

SECURITY ELEMENT

CROSS-REFERENCE TO RELATED APPLICATION

This application is a National Phase of International Application Serial No. PCT/EP2004/007680, filed Jul. 12, 2004.

BACKGROUND OF THE INVENTION

1. Field of the Invention

The invention relates to a security element for protecting objects of value, which has a liquid-crystalline material. Furthermore, the invention relates to an object of value, a transfer material and method for producing such security elements and objects of value as well as a method for checking such a security element or object of value.

2. Background of the Art

An object of value within the terms of the invention can be any object to be protected, such as for example trademarked products or documents of value. Objects of value within the terms of the present invention are, in particular, security documents such as bank notes, but also share certificates, deeds, stamps, checks, check cards, credit cards, identity documents, passports, admission tickets, tickets, flight tickets and the like as well as labels, seals, packagings, security paper or other elements for the product protection. The simplifying term "object of value" or "security element" therefore in the following always includes documents of the mentioned type.

From DE 199 41 295 A1 a security element with liquid-crystalline material is known, which has thermochromic properties. Upon heating the thermochromic liquid-crystalline material changes its color or becomes transparent, so that the security element can be recognized as such by a viewer.

SUMMARY OF THE INVENTION

One problem with such security elements with liquid-crystalline thermochromic material is, that for obtaining the thermochromic effect a certain difference in temperature is required. But, however, not in every situation it is possible to produce a sufficiently great difference in temperature, which is why the expected color change does not occur.

It is therefore the problem of the present invention to create an object of value, a transfer element and a security element, the check of which can be effected independently of temperature and can be easily carried out both visually and by machine. In addition, the manufacturing of the object of value, transfer element and security element shall be especially simple, and they shall guarantee a high degree of protection from forgery.

It is further the problem of the invention to provide methods for producing such a security element and object of value as well as a method for checking the security element or object of value.

These problems are solved by the features disclosed herein.

According to the invention the security element has at least one liquid-crystalline material, the material effecting a linear polarization of light.

By checking whether the light diffusely reflected and/or transmitted by the security element is polarized, the authenticity of the security element is checked with a high degree of reliability and independently of the surrounding temperature or of differences in temperature to be produced. The improvement of the forgery-proofness in particular results from the use of polarizing liquid-crystalline materials, since such materials either are elaborately to produce or cannot readily be commercially obtained, but can be adjusted, in contrast to normal, to thick and rigid polarization foils, to the objects to be protected and be processed with methods, which are similar to those as already used with security prints.

Preferably, lyotropic liquid crystals are used as a liquid-crystalline material. Here a solution containing lyotropic liquid crystals is applied onto at least one surface of the security element, while shearing forces are exerted. Preferably, a layer with a thickness of some microns is applied, which after the evaporation of the solvent leads to a remaining layer thickness of 100 to 1000 nanometer. Conventional polarization foils have thicknesses of at least 0.1 millimeter.

For the liquid-crystalline materials according to the invention within the framework of the invention numerous variation possibilities are expedient. The liquid-crystalline material can be provided all-over or preferably only in certain areas, in particular in the form of characters or patterns.

The security element can either be produced directly on the object of value or prepared on a separate substrate. With respect to the material used, the object of value or the separate substrate, on which the security element is located, is in no way restricted. But preferably it is paper or plastic, also in the form of foils. In the case of a separate substrate the security element can be formed, for example, as a self-supporting label, preferably on a plastic substrate. In particular, the security element has the form of a security thread, especially preferred a window thread. The latter allows an especially striking visual testing by comparing areas with polarized light to such with unpolarized light.

In some cases it may be difficult to provide the respective layer sequence directly on the object of value, therefore, alternatively, it may be expedient, to prepare the layer structure of the security element at least partially on a transfer material.

If the entire layer sequence of the security element is prepared on a transfer material, attention will have to be paid to the fact that the layer structure shown in the respective Figures has to be prepared in the reverse order on the carrier tape of the transfer material. The layer structure of the security element can be prepared in an endless form on the carrier tape. The fastening as a security element on an object of value to be protected is effected with the aid of an adhesive layer, which either is applied onto the object of value or onto the topmost layer of the transfer material. Preferably, for this a hot-melt adhesive is used. In order to determine the outline form of the security element, there either can be provided an adhesive layer only in the areas to be transferred, or the adhesive, such as for example a hot-melt adhesive, is activated only in the areas to be transferred. After the transfer the carrier tape of the transfer material is stripped off and merely the shown layer structure of the security element remains on the object of value to be secured.

The object of value, onto which the security element is applied, can be, for example, a security paper, a security document, but also product packagings. Other objects of value, for which a protection in terms of security is required, of course can also be provided with the security element according to the invention.

Preferably, the security element is disposed as a whole on the surface of the object to be secured. When the security element is completely disposed on the surface of the object, it can be designed to have a substantially larger surface, so that the optical effect of the liquid-crystalline material due to the larger area is much more striking.

BRIEF DESCRIPTION OF THE DRAWINGS

Further advantages and embodiments of the invention are explained in more detail with reference to the Figures. The proportions (in particular layer thicknesses) shown in the Figures do not necessarily correspond to the dimensions present in reality and primarily serve for the improvement of clarity.

For clarity's sake the invention is explained in more detail only with reference to a bank note. But it is obvious, that the invention can be used without any problems for the above-mentioned objects of value.

DETAILED DESCRIPTION OF THE INVENTION

Figure 1:
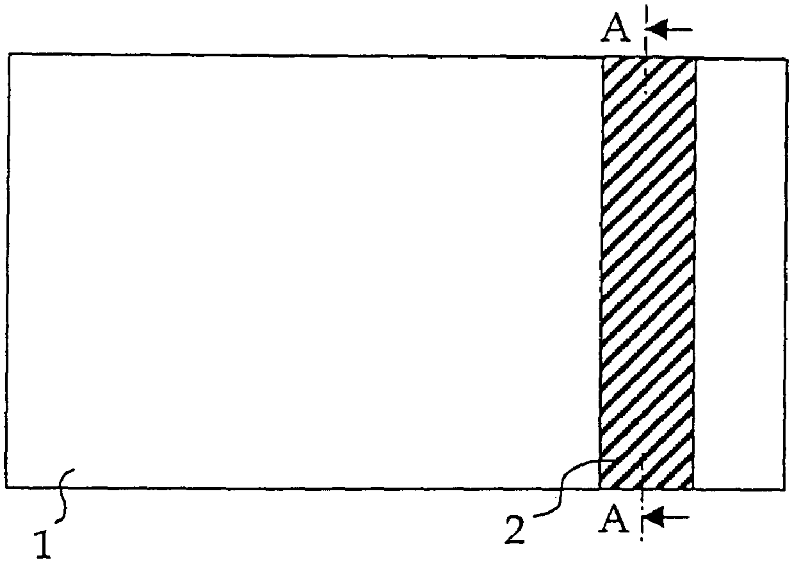
FIG. 1 shows a bank note with a security element according to the invention.

FIG. 1 shows a bank note 1 made of paper or plastic, which is provided with a security element 2 in the form of a strip extending over the entire width of the bank note 1. The bank note 1 of course can have further security features, such as watermark, steel gravure print, security thread, luminescent and/or magnetic prints etc.

The security element 2 has a liquid-crystalline layer. The liquid-crystalline layer of the security element 2 has at least one liquid-crystalline material, which effects a linear polarization of light. The security element 2 is completely disposed on the surface of the bank note 1, so that the light-polarizing effect of the liquid-crystalline layer preferably applied in the form of patterns and/or characters is very well recognizable. The patterns and/or characters can effect linear polarizations, which have different orientation, i.e. the polarization direction of the security element 2 is locally different. By checking whether and in which direction light diffusely reflected and/or transmitted by the security element 2 is polarized, the authenticity of the security element 2 can be checked with a high degree of reliability.

Preferably, lyotropic liquid crystals are used as a liquid-crystalline material. Lyotropic liquid crystals are liquid crystals formed by organic material, which have liquid-crystalline properties both in a for example aqueous solution and after the removal of the solvent. Advantageously, a solution containing lyotropic liquid crystals is applied onto at least one surface of the security element, while shearing forces are exerted. Preferably, a layer thickness of some micron is applied, which, after the evaporation of the solvent, leads to remaining layer thicknesses of 100 to 1000 nanometer. The layer remaining after the evaporation of the solvent has plies of the organic material ordered in supramolecular complexes, for example polymers. The surfaces of the molecules as well as their dipole moments of the optical transmission are oriented perpendicular to the axis of the macroscopic orientation of the remaining layer. The polarization direction of the remaining layer therefore corresponds to the direction of the shearing force applied during the application of the solution containing the lyotropic liquid crystals.

Such lyotropic liquid crystals partly have polarization spectra which do not have a polarization and for this reason even with a, in relation to the polarization direction of the liquid crystals, crossed analyzer they transmit a certain spectral portion, so that light, with which the security element 2 is irradiated, after the transmission through the layer of the lyotropic liquid crystals, beside a linear polarization has a certain color, e.g. red, violet or blue. Further colors are possible, e.g. even in the not visible area of light. In particular, a polarization of infrared or ultraviolet light can also be achieved. The polarization or non-polarization of certain wavelength ranges (colors) thus can be effected selectively. By analyzing both the polarization and the residual color with crossed polarizers an especially reliable determination of the security element is possible.

Detailed specifications for producing and applying the lyotropic liquid crystals can be inferred from U.S. Pat. No. 5,739,296, U.S. Pat. No. 6,049,428 and WO 02/087782 A1.

The described color effect on the light, which is transmitted through the security element 2, can be perceived particularly well, when for viewing as an analyzer a linear polarizer is used, the polarization direction of which in relation to the polarization direction of the liquid-crystalline layer of the security element 2 is turned by 90 degrees. The same effect can be achieved, when already the light used for the illumination of the security element 2 is linearly polarized with the help of a linear polarizer, the polarization direction of which is turned by 90 degrees in relation to the polarization direction of the liquid-crystalline layer of the security element 2. The above-described polarizers used for the proving, advantageously can also be produced with the lyotropic liquid crystals used for the security element 2.

As the described color effect is based on the absorption of the light, which is linearly polarized in a certain spectral region and coming from the security element, in the analyzer, when embedding the security element in a scattering substrate such as bank note paper or disposing it on the back of the substrate, the polarization is cancelled and thus the color effect. By partially embedding the security element in the substrate, as with a so-called window security thread, with a parallel orientation of the polarization direction of the analyzer the difference in brightness and color between the embedded areas and the bare areas of the security element is only small, and with an orientation turned by 90 degrees the difference is very striking.

Beside the described liquid-crystalline layer the security element 2 can have further layers, which alone or in combination with other layers of the security element 2 produce further striking optical effects.

Some preferred embodiments are explained in more detail with reference to the FIGS. 2 and 3, which show the bank note 1 in cross section along the dash-dotted line A-A, so as to illustrate the layer structure of the security element 2.

Figure 2:
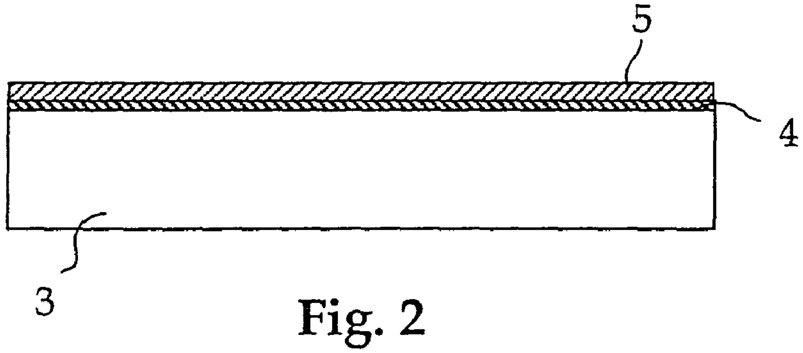
FIGS. 2,3 show various embodiments of the security element according to FIG. 1 in cross section.

According to FIG. 2 the paper substrate or plastic substrate 3 of the bank note 1, which has a white or bright inherent color, is provided with a lyotropic liquid-crystalline layer 4 in the form of characters or patterns. In order to improve the applying of the lyotropic liquid-crystalline layer 4, in particular for a paper substrate 3 it can be provided, that a so-called primer layer is applied onto the paper substrate 3. The primer layer can be, for example, a colorless plastic layer or an ink layer, the surface of which has an only low roughness.

With certain embodiments, e.g. security elements which when used are subject to a heavy mechanical or chemical load, it is expedient to cover the liquid-crystalline materials with a protection layer 5. The protection layer 5 can be a foil laminated over the security element 2 or a protective lacquer layer. The protective lacquer layer can be applied all-over or in partial areas. For this purpose e.g. UV lacquers, hybrid lacquers, oil-based lacquers or dispersion lacquers of the one- or two-component type can be used. The protective lacquer layer preferably is printed, e.g. by flexographic printing or offset printing.

Likewise, the security element 2 can be a separate element, which is adapted to be applied onto the bank note. The separate security element 2 can have a structure, which corresponds to the structure described with reference to FIG. 2. In this case the substrate 3, e.g. a transparent plastic foil, of the security element 2 is adhesively bonded to the bank note 1. For this purpose the plastic forming the substrate 3 can be a hot-melt adhesive.

Figure 3:
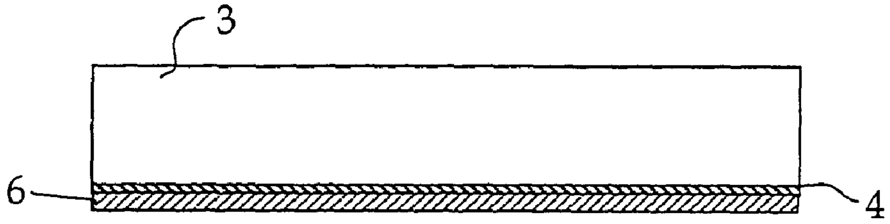

In FIG. 3 a variant of the separate security element 2 is shown. Onto a substrate 3, e.g. a transparent plastic foil, a lyotropic liquid-crystalline layer 4 is applied. Onto the liquid-crystalline layer 4 then an adhesive layer 6 is applied, with the help of which the security element 2 is fastened to the bank note 1. The adhesive used for this purpose can be a hot-melt adhesive. Instead of onto the security element 2 the adhesive can also be applied onto the bank note 1 in order to fasten the security element 2 to the bank note 1.

If the foil 3 consists of birefringent material (e.g. expanded polymer foil) with the right orientation and predetermined phase shift (e.g. quarter-wave or half-wave plate), the compound according to FIG. 2 or 3 depending on the layer sequence acts as a linear- or as a circular-(general elliptic) polarizer for transmitted light. The results (e.g. when used as a lookthrough register) are different polarizations and testing possibilities in the two possible transmission or viewing directions.

Figure 4:
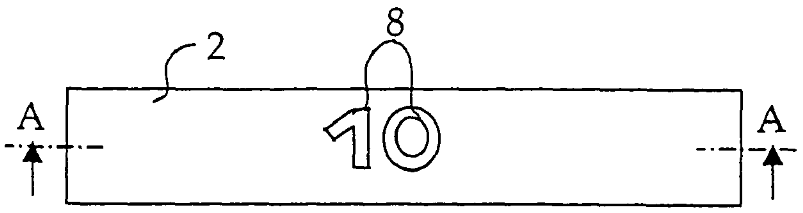
FIG. 4 shows an embodiment of the security element according to FIG. 1 in top view.
Figure 5:
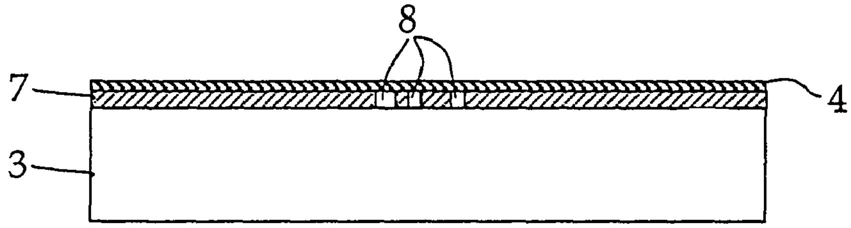
FIGS. 5,6 show various embodiments of the security element according to FIG. 4 in cross section.
Figure 6:
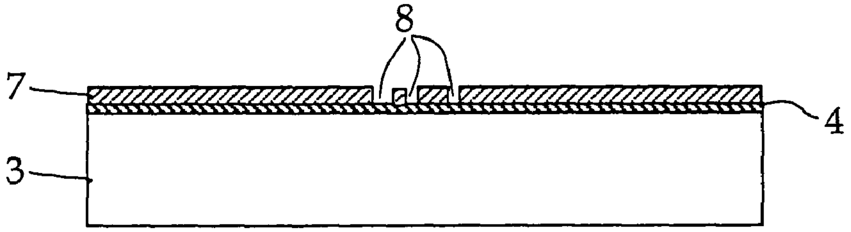

The FIGS. 4 to 6 show further preferred embodiments, wherein FIG. 4 shows a security element 2 in plan view, whereas the FIGS. 5 and 6 show the security element in cross section along the dash-dotted line A-A, so as to illustrate the layer structure of the security element 2.

FIG. 4 shows a security element 2 with pieces of information 8. These pieces of information can be present, for example, in the form of plain text, e.g. alphanumeric characters.

From FIG. 5 is apparent, that the security element 2 comprises a substrate 3, e.g. a transparent plastic foil, of a metal layer 7, which can be e.g. sputtered, vapor-deposited, adhesively bonded etc. onto the substrate 3 and does not have any metal in the areas containing the pieces of information 8, as well as of a lyotropic liquid-crystalline layer 4 applied onto the metal layer. The gaps formed in the metal layer 7 by the pieces of information 8 can be filled in with the help of a filling material, e.g. transparent plastic material.

FIG. 6 shows a variant of the security element 2 represented in FIG. 5, wherein on the substrate 3 at first the lyotropic liquid-crystalline layer 4 is applied. Thereon the metal layer 7 is disposed.

The embodiments of the security element 2 described in the FIGS. 5 and 6 can have further components, e.g. the above-described protection layer, adhesive layer etc. Likewise, it is possible to produce the security element 2 directly on a bank note 1, then the substrate of the bank note 1 forms the substrate of the security element.

In a security element 2 according to FIG. 5 the above-described optical effects be viewed on transmission only in the area of the pieces of information 8. In a security element according to FIG. 6 the described optical effects can be viewed both on transmission as well a on diffuse reflection only in the area of the pieces of information 8.

Figure 7:
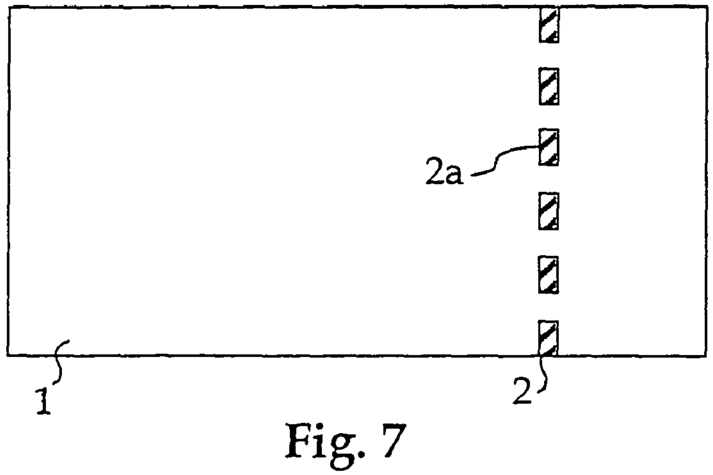
FIG. 7 shows an embodiment of a bank note with a security element according to the invention.

A further embodiment of a bank note 1 with security element 2 is shown in FIG. 7. The security element 2 at least partially is embedded in the substrate of the bank note 1, so that the security element 2, which e.g. is a security thread, is visible only in certain areas 2*a*, so-called "windows". The above-described optical effects then are only visible in the areas 2*a*.

The security element can also be designed as a transfer material, with a structure such as described with reference to the FIGS. 1 to 6. In this case the layer structure is applied in reverse order onto a transfer material. The security element is applied onto the bank note with the help of the transfer material and the transfer material thereafter is entirely or partially removed.

As already mentioned, the security element can have further layers or components, the additional layers can be used separately or in combination, the layers can cover the entire security element or only parts thereof.

For example, underneath the polarizing liquid-crystalline layer can be disposed a fluorescent layer or fluorescent areas. Radiated fluorescent light then is linearly polarized.

Likewise, interference layers can be disposed above or underneath the polarizing liquid-crystalline layer.

Furthermore, it is possible to produce interference pigments. For this purpose onto one side or on both sides of such interference layers are applied liquid-crystalline layers. The layer compound formed in such a way is broken into pigments, which are polarizing. The polarizing interference pigments formed in such a way can be used, also in a mixture with not polarizing interference pigments, for producing security elements and can be for example printed onto these. These then show, beside the directional dependence of the color, also a polarization of the backscattered light.

Furthermore, the security element can have further polarizing layers, as well as diffraction structures which for example can form holograms.

Likewise, the security element can have a phase-shifting layer, the proving of which can be effected with the help of a phase plate.

The security element can also be formed as a so-called planchet, which preferably is incorporated in the surface of the bank note substrate, and on one side or on both sides is provided with polarizing layers.

According to the invention it can also be provided to attach at least one lyotropic liquid-crystalline layer onto a lookthrough register. Lookthrough register within the terms of the invention means an area in a bank note that is transparent. The lookthrough register can be formed, for example, by the substrate of the bank note itself, if it is made of plastic. But it is also possible to incorporate a respectively designed lookthrough register, e.g. a plastic foil, in the paper substrate of a bank note. Here it is especially advantageous, when on both surfaces of the lookthrough register a lyotropic liquid-crystalline layer is applied, these being disposed such that their polarizations are turned by 90 degrees. Thereby the above-described color effect is maximized.

In a different embodiment the foil of the lookthrough register can be birefringent. Then, depending on whether the irradiation is effected from the layer side or from the foil side, the above-described direction-dependent linear or circular polarization of the transmitted light is the result.

The lookthrough register can also have diffraction structures, which e.g. form a semitransparent hologram.

As described above the security element 2 can be produced directly on the bank note 1 or provided as a separate security element 2 and fastened to the bank note 1. But it can also be provided to provide a separate security element 2, the structure of which is not completed until the security element 2 has been fastened to the bank note 1, e.g. is provided with a polarizing layer or a protection layer.

Figure 8:
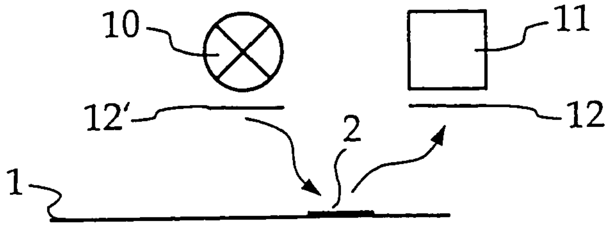
FIGS. 8,9,10 show apparatuses for checking bank notes with security element according to the invention.

FIGS. 8 to 10 show apparatuses for the check of bank notes having security element according to the invention.

FIG. 8 shows an arrangement consisting of a light source 10, a detector 11 and a bank note 1 having a security element 2, for checking the bank note 1 with the help of light diffusely reflected by the bank note 1. The light of the light source 10 passes through the linearly polarizing layer of the security element 2 and thereby is linearly polarized. This light is scattered by the substrate of the bank note 1 and in this way depolarized. The scattered light passes through the linearly polarizing layer of the security element and again is linearly polarized. With the help of the detector 11 the presence of the security element 2 can be proven, if the detected light is linearly polarized. If the security element 2 has regions of different polarization, then perceivable light/dark contrasts will be the result. Instead of or additionally to the polarization, the above-described color effect of the light coming from the security element 2, which is determined by the type of the lyotropic liquid crystal used, can be evaluated by the detector 11. If in front of the light source 10 and/or in front of the detector 11 is placed a polarizer 12 or 12', which has a linear polarization, which in relation to the linear polarization of the security element 2 is turned by 90 degrees, the color effect or the light/dark contrast for the light coming from the security element 2 will become more intensive. Ideally, the polarizers 12 or 12' have a linearly polarizing layer, which consists of the same lyotropic liquid crystal as the polarizing layer of the security element 2.

Figure 9A:
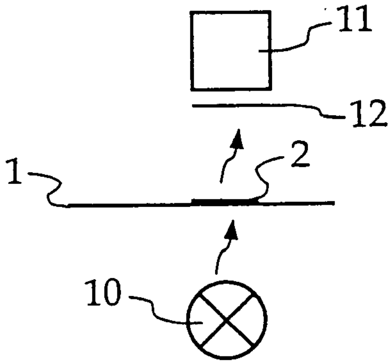

FIG. 9*a* shows an arrangement consisting of a light source 10, a detector 11 and a bank note 1 having a security element 2, for checking the bank note 1 with the help of light transmitted through the bank note 1. The light of the light source 10 passes through the substrate of the bank note 1 and the linearly polarizing layer of the security element 2. Thereby the light is linearly polarized. With the help of the detector 11 the presence of the security element 2 can be proven, if the detected light is linearly polarized. Instead of or additionally to the polarization, the above-described color effect of the light coming from the security element 2, which is determined by the type of the lyotropic liquid crystal used, can be evaluated by the detector 11. If in front of the detector 11 is placed a polarizer 12, which effects a linear polarization, which in relation to the linear polarization of the security element 2 is turned by 90 degrees, the color effect of the light coming from the security element 2 will become more intensive. Ideally, the polarizer 12 has a linearly polarizing layer, which consists of the same lyotropic liquid crystal as the polarizing layer of the security element 2.

Figure 9B:
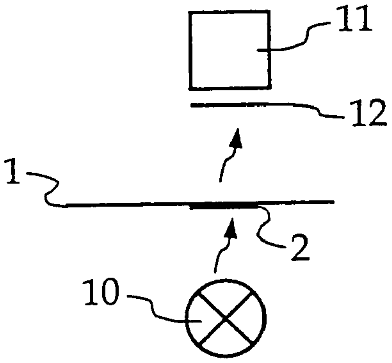

In FIG. 9*b* the security element 2 is located on the side of the bank note 1 facing the light source 10. The light passing through is depolarized by scattering in the substrate of the bank note 1; in the detector 11 one observes no polarization and no color effect. This is the case, for example, in the window security thread at those places, where it is embedded in the substrate.

Figure 10A:
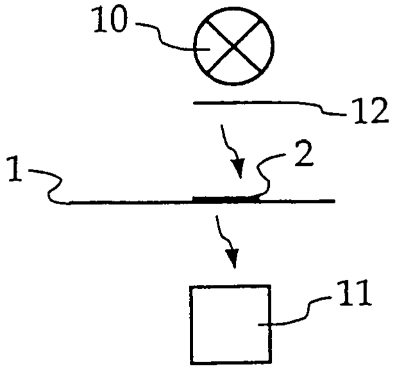
Figure 10B:
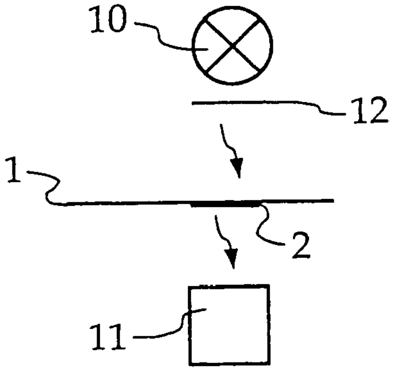

In FIG. 10 light source 10 and detector 11 have been interchanged compared to FIG. 9. FIG. 10*a* shows the case, wherein the security element 2 is illuminated with polarized light and at least the color effect can be viewed also through the scattering bank note substrate 1, while the transmitted light is depolarized by the scattering at the substrate of the bank note. FIG. 10*b* shows the case, wherein in transmitted light no effect occurs, since the light illuminating the security element 2 is unpolarized, and the linear polarization effected by the polarizing layer is depolarized by scattering in the bank note substrate.

Instead of by a detector 11 the check of the security element 2 in diffuse reflection as well as in transmitted light can be effected also visually by a person, who checks whether the described color effect occurs.

By turning the polarizer 12 or 12' or the bank note relative to the polarization direction, which is given by the illumination or the viewing, moreover, an increase and decrease of the described color effect can be viewed. When visually viewing window security threads or other security elements partially embedded in the bank note substrate, moreover, as a reference a blank effect will always be there, i.e. places without the described effect.

The visual testing by a person can be effected especially advantageous and simple, when the above-described lookthrough register according to the invention is provided with a polarizing liquid crystal layer. In this case the lookthrough register can replace the polarizer 12 or 12'. The lookthrough register then can be used for checking further security elements located on the same bank note, e.g. by folding the bank note such that the lookthrough register comes to lie above the further security element. With the lookthrough register the security elements of other bank notes can also be checked.

The color changes described above in connection with the polarizing interference pigments can also be viewed especially well when turning the polarizer 12 or 12'.

Of course it is also possible to place a polarizer as an analyzer in front of both the light source 10 and the detector 11 in the FIGS. 9 and 10. In this case at least the color effect can always be viewed, independently of the position of the security element 2.

The check of a security element according to the invention described with reference to the FIGS. 9 and 10 was explained with respect to a security element applied onto the surface of the substrate of a bank note. It is obvious, that other designs are possible. For example, a substrate can be used for the bank note, which does not cause a scattering, e.g. a plastic substrate. Likewise, the security element, as described above, can be formed as a lookthrough register. In these cases the depolarization by the substrate as explained in connection with the description of the FIGS. 9 and 10 does not occur.

The light source 10 can be a light source, which produces white light, e.g. an incandescent lamp or a gas discharge lamp. The light source 10 can already be provided with a linear polarizer. However, the light source 10 also may produce light with a certain, limited spectrum, e.g. when the light source 10 is formed by a light-emitting diode. If, moreover, the light is to be already linearly polarized, a polarizing laser diode of low power can be used or for visual viewing a laser pointer can be used as a light source.

With the help of the apparatuses for checking bank notes with security element 2 according to the invention described in the FIGS. 9 and 10, or when carrying out the described visual check, the light/dark effects described in connection with FIG. 8 can also be perceived.

The invention claimed is:

1. A security element for an object of value, comprising:

at least one liquid-crystalline material, wherein the liquid-crystalline material effects a linear polarization of light and is formed by a lyotropic liquid crystal, wherein the liquid-crystalline material is applied all-over a metal layer with information formed by gaps, or is applied all-over and is provided with a metal layer having information formed by gaps above the crystalline material.

2. The object of value according to claim 1, characterized in that the liquid-crystalline material has a layer thickness of 100 to 1000 nanometer.

3. The object of value according to claim 1, characterized in that a background is printed, is produced by inking a substrate or with the help of a laser.

4. The object of value according to claim 1, characterized in that at least one of the liquid-crystalline material, the background or a further layer has properties testable by at least one of machine or visually testable.

5. The object of value according to claim 1, characterized in that the security element is a label.

6. The object of value according to claim 1, characterized in that the object of value is a security paper, a security document or a product packaging.

7. The object of value according to claim 1, characterized in that the security element has at least one of at least one further layer producing optical effects or a protection layer, which cover at least a part of the security element.

8. The object of value of claim 1, wherein the liquid-crystalline material is in a form of at least one of alpha numeric characters or patterns, and wherein the liquid-crystalline material affects a locally different polarization.

9. A security element for protecting objects of value, wherein the security element has at least one liquid-crystalline material, wherein the liquid-crystalline material effects a linear polarization of light and is formed by a lyotropic liquid crystal, wherein the liquid-crystalline material is applied all-over a metal layer with information formed by gaps, or is applied all-over and is provided with a metal layer having information formed by gaps above the crystalline material.

10. The security element according to claim 9, characterized in that the liquid-crystalline material has a layer thickness of 100 to 1000 nanometer.

11. The security element according to claim 9, characterized in that the carrier of the liquid-crystalline material is a birefringent foil with predetermined phase shift.

12. The security element of claim 11 wherein said phase shift is a quarter wave or half wave shift.

13. The security element according to claim 9, characterized in that the security element has at least one of at least one further layer producing optical effects or a protection layer, which cover at least a part of the security element.

14. The security element according to claim 9, characterized in that the security element is a security thread, a look-through register or a planchet.

15. The security element of claim 9 wherein the liquid-crystalline material is in a form of at least one of alpha numeric characters or patterns.

* * * * *